United States Patent [19]
Nicoll et al.

[11] Patent Number: 5,483,794
[45] Date of Patent: Jan. 16, 1996

[54] MULTI-HOLE FILM COOLED AFTERBURNER COMBUSTOR LINER

[75] Inventors: Robert A. Nicoll, Beverly; John W. Vdoviak, Marblehead, both of Mass.

[73] Assignee: General Electric Company, Cincinnati, Ohio

[21] Appl. No.: 473,802

[22] Filed: Jun. 7, 1995

Related U.S. Application Data

[62] Division of Ser. No. 66,609, May 21, 1993, which is a continuation of Ser. No. 667,165, Mar. 11, 1991, abandoned.

[51] Int. Cl.$^6$ ........................................... F02K 3/10
[52] U.S. Cl. .......................... 60/261; 60/266; 60/757
[58] Field of Search ........................ 60/261, 266, 752, 60/755, 757

[56] References Cited

U.S. PATENT DOCUMENTS

| | | | |
|---|---|---|---|
| 3,163,982 | 1/1965 | Rice | 60/261 |
| 3,527,543 | 9/1970 | Howald | 416/90 |
| 3,623,711 | 11/1971 | Thorstenson | 263/19 A |
| 3,712,062 | 1/1973 | Nash | 60/757 |
| 3,826,088 | 7/1974 | Nash et al. | 60/261 |
| 3,837,411 | 9/1974 | Nash et al. | 60/261 |
| 3,866,417 | 2/1975 | Velegol | 60/261 |
| 4,566,280 | 1/1986 | Burr | 60/757 |
| 4,642,993 | 2/1987 | Sweet | 60/752 |
| 4,653,983 | 3/1987 | Vehr | 416/97 R |
| 4,664,597 | 5/1987 | Auxier et al. | 416/97 R |
| 4,695,247 | 9/1987 | Enzaki et al. | 431/352 |
| 4,696,431 | 9/1987 | Buxe | 239/265.15 |
| 4,773,593 | 9/1988 | Auxier et al. | 239/127.3 |
| 4,800,718 | 1/1989 | Zimmerman | 60/757 |
| 4,833,881 | 5/1989 | Vdoviak et al. | 60/261 |
| 4,848,081 | 7/1989 | Kennedy | 60/757 |
| 4,864,818 | 9/1989 | Taylor | 60/261 |
| 4,878,283 | 11/1989 | McLean | 29/163.6 |
| 4,896,510 | 1/1990 | Foltz | 60/757 |
| 4,923,371 | 5/1990 | Ben-Amoz | 416/97 R |
| 5,279,127 | 1/1994 | Napoli | 60/757 |

FOREIGN PATENT DOCUMENTS

| | | |
|---|---|---|
| 486133A1 | 5/1992 | European Pat. Off. . |
| 492864A1 | 7/1992 | European Pat. Off. . |
| 0587513 | 4/1947 | United Kingdom . |
| 0726290 | 3/1955 | United Kingdom . |
| 0762596 | 11/1956 | United Kingdom . |
| 0791463 | 3/1958 | United Kingdom . |
| 0857345 | 12/1960 | United Kingdom . |
| 0953060 | 3/1964 | United Kingdom . |
| 2221979 | 2/1990 | United Kingdom . |

OTHER PUBLICATIONS

R. E. Mayle et al., "Multihole Cooling Film Effectiveness and Heat Transfer," Nov. 1975, pp. 534–538.

D. A. Nealy et al., "Alternate Cooling Configuration for Gas Turbine Combustor Systems," May 1985.

Dr. G. J. Sturgess, "Advanced Low–Emissions Catalytic–Combustor Program—Phase I Final Report," Jun. 1981, Report No. NASA–CR–159656, pp. 1–156.

*Primary Examiner*—Stephen C. Bentley
*Attorney, Agent, or Firm*—Andrew C. Hess; Patrick R. Scanlon

[57] ABSTRACT

The present invention provides a cooling apparatus with two spaced apart walls, one of which is a coolable wall, having a cooling flowpath between them wherein the cooling flowpath is converging in the direction of the cooling flow. In one embodiment the coolable wall is an afterburner cooling liner that includes a film cooling means on the hot side of the liner. Another embodiment provides a corrugated or wavy wall afterburner cooling liner wherein each wave includes a forward facing surface, from crest to trough of the wave in the direction of the hot gas flow, and an aft facing surface, from trough to crest. A high density pattern of multi-hole film cooling holes is disposed on the hotter of the two surfaces and a lower density pattern on the cooler one.

2 Claims, 2 Drawing Sheets

MULTI-HOLE FILM COOLED AFTERBURNER COMBUSTOR LINER

This application is a continuation of application Ser. No. 08/066,609, filed May 21, 1993, which is a File Wrapper Continuation of application Ser. No. 07/667,165, filed Mar. 11, 1991, now abandoned.

BACKGROUND OF THE INVENTION

1. Field of the Invention

This invention relates to coolable walls such as film cooled combustor liners for use in gas turbine engines, and more particularly, to aircraft gas turbine engine afterburner liners.

The invention described herein was made in the performance of work under U.S. NAVY contract N00019-80-C-0017 and the U.S. Government has rights therein.

2. Description of Related Art

Afterburning aircraft gas turbine engines, such as turbofan engines used in fighter aircraft, burn fuel in the exhaust section of the engine producing a hot gas usually at an intensely high temperature such as 3,000° F. or even higher. To prevent this intense heat from damaging the afterburner and surrounding parts of the engine, before the hot gas exits to an exhaust nozzle, an afterburner heat shield or combustor liner is provided.

Conventional afterburner combustion liners incorporate convection and film cooling that are provided by circumferentially disposed rows of film cooling slots such as those depicted in U.S. Pat. No. 4,566,280 by Burr and U.S. Pat. No. 4,733,538 by Vdoviak et al. These liners are typified by complex structures that have non-uniform liner thicknesses that give rise to thermal gradients that in turn cause low cycle fatigue in the liner and therefore shorten their potential life expectancy and reduce their durability. The complex shapes and fabrication required to produce these liners adversely affects their cost and weight.

A more detailed discussion of the related art may be found in related U.S. Pat. No. 5,181,379 entitled "GAS TURBINE ENGINE MULTI-HOLE FILM COOLED COMBUSTOR LINER AND METHOD OF MANUFACTURE", invented by Wakeman et al., which issued Jan. 26, 1993, assigned to the same assignee and U.S. Pat. No. 5,233,828 entitled "COMBUSTOR LINER WITH CIRCUMFERENTIALLY ANGLED FILM COOLING HOLES", invented by Napoli, which issued Aug. 10, 1993, assigned to the same assignee, and both are incorporated herein by reference.

Engine designers have long sought to incorporate low weight single wall afterburner liners capable of withstanding the temperatures and pressure differentials found in afterburners. To that end the invention described in the Wakeman reference provides a single wall, preferably sheet metal, annular combustor liner having multi-hole film cooling holes which are disposed through the wall of the liner at sharp downstream angles. The multi-hole film cooling holes are spaced closely together to form at least one continuous pattern designed to provide film cooling over the length of the liner. The Wakeman reference discloses multi-hole film cooling holes which have a diameter of about 20 mils with a nominal tolerance of about ±2 mils, are spaced closely together about 6½ to 7½ hole diameters apart, have a downstream angle of 20 degrees with a nominal tolerance of about ±1 degree. Axially adjacent holes are circumferential offset by half the angle (or distance) between circumferentially adjacent holes to 10 further enhance the evenness of the cooling film injection points. The Wakeman reference further discloses an embodiment wherein the liner may be corrugated so as to form a wavy wall which is designed to prevent buckling and is particularly useful for aircraft gas turbine engine afterburners.

Afterburner cooling uses a significant percentage of cooling air which is usually taken from the fan section of the engine, This is costly air in terms of fuel and power consumption and therefore aircraft engine designers are always seeking means for reducing the amount of cooling air required to cool afterburner liners.

SUMMARY OF THE INVENTION

The present invention provides two spaced apart walls having a cooling flowpath between them wherein the cooling flowpath is converging in the direction of the cooling flow. One of the walls is a coolable wall which may have a film cooling means for forming a cooling film on the hot side of the coolable wall (the side facing away from the cooling flowpath). The preferred embodiment has a single wall multi-hole film cooling afterburner liner similar to that described in the Wakeman reference.

In accordance with one embodiment of the present invention, the combustor liner may be corrugated so as to form a wavy wall wherein each wave includes a forward facing surface, from crest to through of the wave in the direction of the hot gas flow, and an aft facing surface, from through to crest. A high density pattern of multi-hole film cooling holes is disposed on the hotter of the two surfaces and a lower density pattern on the cooler one.

ADVANTAGES

Coolable walls made in accordance with the present invention improves the cooling process using less cooling air than that required with more conventional cooling apparatus. An aircraft gas turbine engine afterburner liner made in accordance with the present invention should last longer and require less cooling air than its more conventional counterparts thereby permitting savings in fuel consumption and power.

Another advantage of the present invention is that it provides lower weight and less complex afterburner liners that are cheaper and easier to fabricate than more conventional liners.

Yet another advantage of the present invention is that it allows reduced afterburner liner cooling air requirements that in turn permits increased augmented thrust or larger core flow for increased thrust per pound of air.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
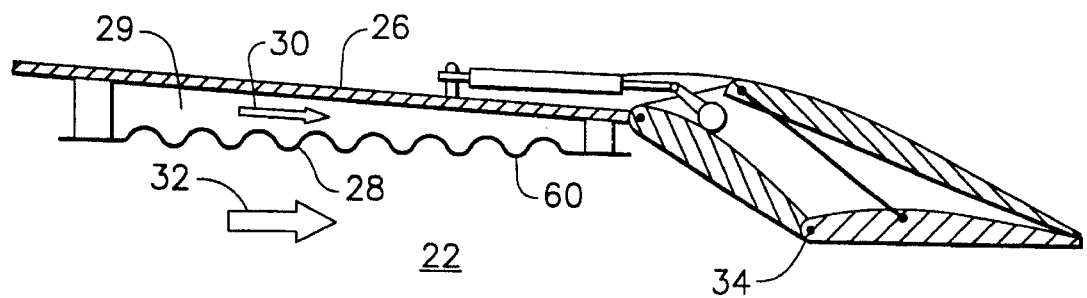
FIG. 1 is a diagrammatic cross sectional view of a typical gas turbine engine afterburning exhaust section in accordance with the present invention.

Referring to FIG. 1, an afterburning exhaust section 22 is used to burn additional fuel in order to augment the thrust of an aircraft gas turbine engine (not shown). Exhaust section 22 contains a hot gas flow 32 which is circumscribed by an annular case 26 and an annular afterburner liner 28 disposed radially inward of casing 26 forming a cooling path 29 therebetween. A variable exhaust nozzle 34 is disposed downstream of afterburner liner 28 and is operable to receive cooling air from cooling flowpath 29.

Figure 2:
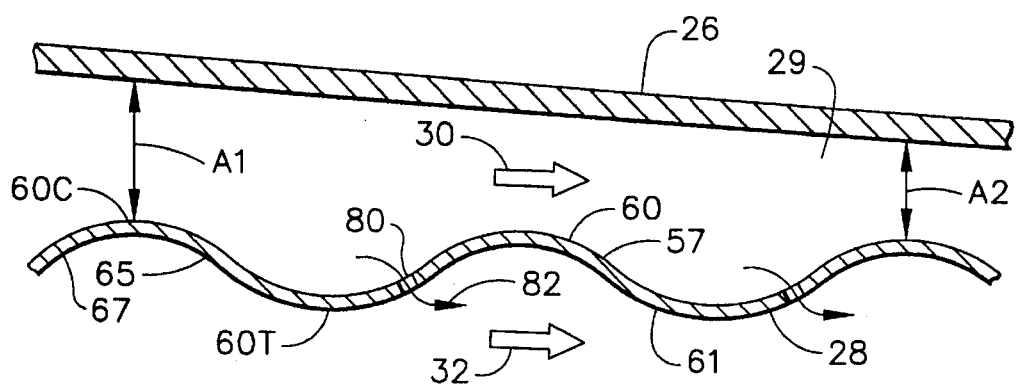
FIG. 2 is an enlarged view of the liner and outer casing of the exhaust section depicted in FIG. 1 according to the preferred embodiment of the present invention.

The preferred embodiment of the present invention provides a convergent cooling path 29 between casing 26 and afterburner liner 28 wherein an upstream area A1 is larger than a corresponding downstream area A2 as shown in FIG. 2. The preferred embodiment of the invention depicts afterburner liner 28 as having a wavy wall or corrugated cross section however the present invention is applicable to smooth or straight wall afterburner liners and those having segments, rings, and nuggets. Convergent cooling path 29 accelerates the cooling air 30 within the cooling path which decreases the static pressure of cooling air 30. This allows the pressure drop across liner 28 to be generally maintained at a predetermined value. Convergent cooling path 29 also enhances the convective cooling as cooling air 30 dissipates in its axial flow direction.

The preferred embodiment provides a multi-hole film cooling means for afterburner liner 28 including a plurality of small diameter, about 20 mils (0.02 inches), closely spaced, sharply downstream angled film cooling holes 80 which are axially rearward slanted from cold surface 57 to hot surface 61 of afterburner liner 28 at an angle in the range of about 15° to 20°. The preferred embodiment includes corrugations or waves 60 forming a wavy wall afterburner liner 28 wherein each wave includes a forward facing surface 65, from crest 60C to trough 60T of the wave in the direction of hot gas flow 32, and an aft facing surface 67, from trough to crest.

Figure 3:
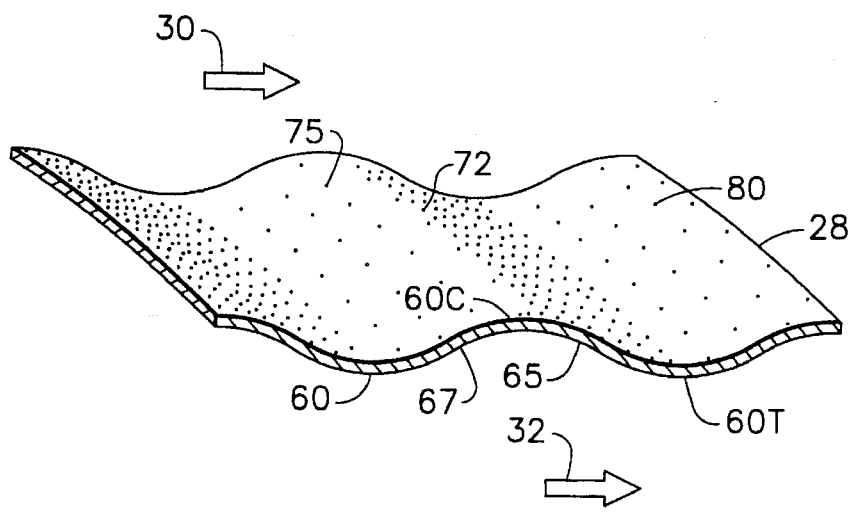
FIG. 3 is a partial perspective view of the afterburner liner depicted in FIG. 1 having a preferential pattern of multi-hole film cooling holes in accordance with the preferred embodiment of the present invention.

Referring to FIG. 3 the preferred embodiment provides a tailored cooling hole pattern whereby forward facing surface 65 is subject to higher heating rates, due mainly to higher radiation and convection heating, than aft facing surface 67 and therefore is provided with a high density pattern 72 of multi-hole cooling holes 80 while aft facing surface is provided with a relatively low density pattern 75. The present invention contemplates cooling hole density patterns or hole spacing of multi-hole cooling holes 80 which may be constant over the liner as well as tailored to localized heating, especially repetitive areas of increased and decreased heating, as in the preferred embodiment.

Tailoring of hole spacing such as in the present invention is facilitated by modern day hole drilling processes such as laser and electron beam hole drilling which can be automated to efficiently produce multi-hole film cooling hole patterns.

Hole spacing may be determined in one manner by establishing a base hole pattern such as perhaps would be required by averaging the heat load over the entire afterburner liner and then biasing the spacing to provide the desired amount of heating for the high and low density patterns.

Figure 4:
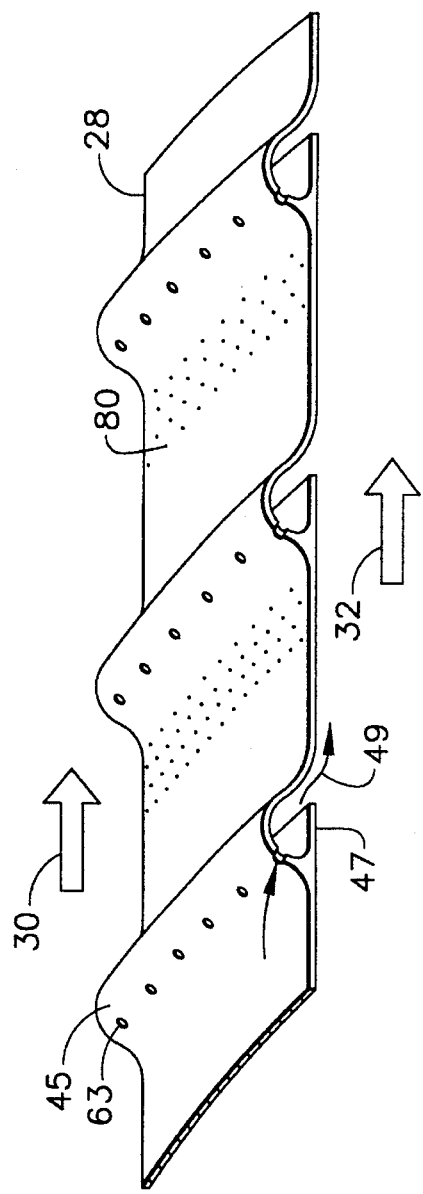
FIGS. 4 is a partial perspective view of the afterburner liner depicted in FIG. 1 having a combination of slot type and multi-hole film cooling means in accordance with an alternative embodiment of the present invention.

The invention is not limited to multi-hole film cooling and includes slot type film cooling means 47 as shown in FIG. 4 which provides nuggets 45 which may be combined with multi-hole film cooling holes 80.

Slot type cooling film starting means 47 provides conventional cooling nuggets 45. The embodiment shown in FIG. 4 includes a series of circumferentially offset rows of multi-hole film cooling holes 80 axially spaced apart from nuggets 45. Nuggets 45 include cooling air feed holes 63 disposed therethrough for providing film cooling air 49 to slots 47.

Figure 5:
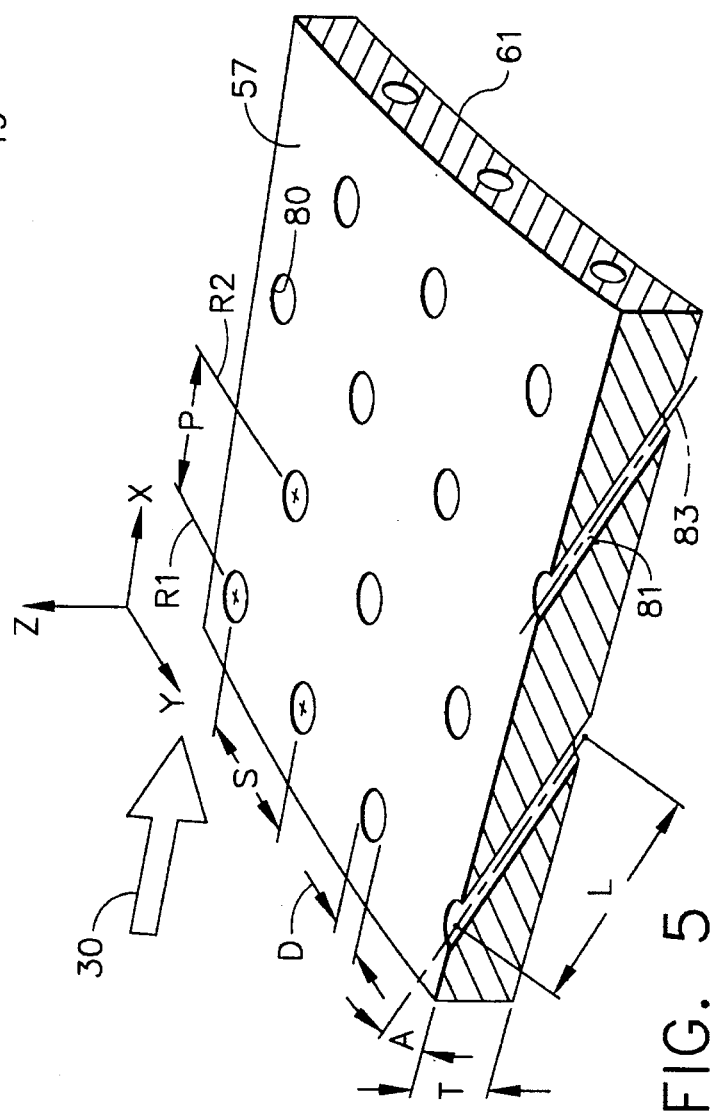
FIG. 5 is an enlarged perspective view of a portion of a combustor liner depicting multi-hole film cooling holes in a portion of a combustor liner in accordance with the preferred embodiment of the present invention.

Referring to FIG. 5, an enlarged view of a portion of an afterburner liner in accordance with one embodiment of the present invention is shown together with a frame of reference having axes labelled X, Y, and Z wherein X indicates the downstream direction of the flow along the surface of the liner, Y is in the circumferential direction, and Z is normal to the combustor liner surface on the surface of the liner. The means for providing multi-hole film cooling, shown in greater detail in FIG. 5, comprises a plurality of small diameter, closely spaced, sharply downstream (indicated by the arrow in FIG. 5) angled film cooling holes 80 that are axially rearward slanted from cold surface 57 to hot surface 61 of afterburner liner 28 at an angle in the range of about 15° to 20°. Furthermore, in accordance with the preferred embodiment of the invention axially adjacent sets of circumferential cooling hole rows R1 and R2 are circumferentially offset from each other by half the angle or distance S between circumferentially adjacent holes of one of the rows. The intra-row distance S between cooling holes 80 within a row may be equal to the inter-row distance P between adjacent rows of holes.

It has been found that from a manufacturing and cost standpoint a downstream slant angle A of about 20° is preferred. Smaller downstream slant angles A may be advantageous for improved cooling and therefore an alternative downstream slant angle A in the range of about 20° to 15° may be used if the associated costs are warranted.

Film cooling holes 80 have a preferred diameter of 20 mils (0.02 inches). Intra-row spacing S and inter-row spacing P are factors which usually depend on a specific design. For example, an afterburner liner having an approximately 30 inch diameter preferably has multi-film cooling holes 80 that are spaced apart about 300 to 400 mils off center from each other, as measured between their respective centerlines 83, or about fifteen to twenty (15–20) hole diameters apart wherein the intra-row spacing S and inter-row spacing P are equal.

In the preferred embodiment as depicted in FIGS. 2 and 3, wherein two multi-hole density patterns are provided, the base density pattern, as discussed before, may be a spacing of 300 mils with a biasing of about plus and minus 25% from the base for the high and low density patterns respectively.

Referring again to FIG. 5, liner thickness T, multi-hole film cooling hole intra-row spacing S and inter-row spacing P (spacing distances measured between cooling hole centerlines 83), film cooling hole length L and diameter D, and cooling hole angle A of cooling holes 80 are a function of the cooling flow requirements to meet the durability characteristics of the particular engine in which it is used and to minimize the amount of cooling air used.

Preferably, the combustor liners have a thermal barrier coating on their hot side 61 to further reduce the heat load and cooling requirements of the liners. Cooling holes 80 are laser drilled holes. Typically, combustor liner wall thickness T is sized to meet both mechanical loading and cooling requirements. A length to diameter ratio (L/D) of at least 3.0, preferably larger, is adequate, to provide a reasonable amount of bore cooling through cooling hole 80. This minimum L/D is required to form a good film and to maximize convective cooling along an internal cooling hole surface 81 within cooling hole 80. The process of laser drilling is preferably done by drilling the holes from hot side 61 to cold side 57 of afterburner liner 28, which produces a diffusion cooling hole having an outlet which is slightly wider than the cooling hole inlet. The diffusion of the cooling flow through cooling hole 80 provides a further advantage by enhancing the film cooling effectiveness which reduces the amount of cooling flow needed through cooling holes 80 and the pressure and engine performance losses associated with such cooling means.

The preferred embodiment provides afterburner liner 28 with a buckling resistance means in the form of corrugations or waves 60 shown in FIGS. 1 and 2 having a shallow sine wave form. The method of manufacturing combustor liners incorporating the features of the preferred embodiment of the present invention is more fully described in the above referenced patent application by Wakeman et al.

While the preferred embodiment of our invention has been described fully in order to explain its principles, it is understood that various modifications or alterations may be made to the preferred embodiment without departing from the scope of the invention as set forth in the appended claims.

We claim:

1. A gas turbine engine afterburner comprising:

an outer annular casing;

an afterburner liner spaced radially inward from said outer casing;

a cooling flowpath between said casing and said liner operable to conduct a cooling flow wherein said flowpath converges in the direction of the cooling flow;

said afterburner liner having a cold surface facing said cooling flowpath and a hot surface on the other side of said afterburner liner and a film cooling means disposed through said afterburner liner, said film cooling means comprising a plurality of small, closely spaced film cooling hole patterns angled sharply in the downstream direction; and a plurality of cooling nuggets wherein each of said nuggets is disposed upstream of and apart from a respective one of said cooling hole patterns.

2. A gas turbine engine afterburner as claimed in claim 1 wherein said film cooling holes have a downstream angle slanted from the cold surface to said hot surface with a preferred value of about twenty degrees.

* * * * *